US012239214B2

(12) United States Patent
Oberoi et al.

(10) Patent No.: US 12,239,214 B2
(45) Date of Patent: Mar. 4, 2025

(54) SEALANT APPLICATION ASSEMBLY AND METHODS OF USE

(71) Applicant: The Boeing Company, Arlington, VA (US)

(72) Inventors: Harinder S. Oberoi, Snohomish, WA (US); Kevin Marion Barrick, Kingston, WA (US); Yuanxin Charles Hu, Newcastle, WA (US); Melissa Anne Johnson, Puyallup, WA (US); Laura Carolyn Foster, Brier, WA (US)

(73) Assignee: The Boeing Company, Arlington, VA (US)

( * ) Notice: Subject to any disclaimer, the term of this patent is extended or adjusted under 35 U.S.C. 154(b) by 164 days.

(21) Appl. No.: 18/166,188

(22) Filed: Feb. 8, 2023

(65) Prior Publication Data

US 2024/0260737 A1 Aug. 8, 2024

(51) Int. Cl.
*A46B 11/06* (2006.01)
*B05C 1/06* (2006.01)

(52) U.S. Cl.
CPC .............. *A46B 11/063* (2013.01); *B05C 1/06* (2013.01); *A46B 2200/20* (2013.01)

(58) Field of Classification Search
CPC ..... A46B 11/063; A46B 2200/20; B05C 1/06; B05C 5/0216; B05C 17/00516
See application file for complete search history.

(56) References Cited

U.S. PATENT DOCUMENTS 3,575,181 A * 4/1971 Rudd ..................... A45D 20/22 4/518
10,086,402 B2 10/2018 Tomuta et al.
2015/0224612 A1 8/2015 Henderson et al.

* cited by examiner

*Primary Examiner* — Alexander M Weddle
(74) *Attorney, Agent, or Firm* — Yee & Associates, P.C.

(57) ABSTRACT

A sealant application nozzle comprises a manifold with a incurvate face; bristles extending outward from the incurvate face; and channels within the manifold culminating in outlets exiting through the incurvate face to dispose sealant onto the incurvate face and base of the bristles.

28 Claims, 13 Drawing Sheets

SEALANT APPLICATION ASSEMBLY AND METHODS OF USE

BACKGROUND INFORMATION

1. Field

The present disclosure relates generally to manufacturing and more specifically to applying sealant to fasteners during manufacturing.

2. Background

During manufacturing, applying sealant to fasteners is performed to improve manufacturing or product performance. Sealants can provide at least one of improvement in adhesion, reducing corrosion or other undesirable effects, and providing sealing against moisture. It can be desirable to provide an automated system and method to apply sealant to fasteners to reduce manufacturing time or improve quality.

Therefore, it would be desirable to have a method and apparatus that takes into account at least some of the issues discussed above, as well as other possible issues.

SUMMARY

An embodiment of the present disclosure provides a sealant application nozzle. The sealant application nozzle comprises a manifold with a incurvate face; manifold bristles extending outward from the incurvate face; and channels within the manifold culminating in outlets exiting through the incurvate face to dispose sealant onto the incurvate face and base of the bristles.

Another embodiment of the present disclosure provides a sealant application assembly. The sealant application assembly comprises a sealant source; a motor configured to apply pressure to the sealant source to extrude sealant from the sealant source; and a sealant application nozzle connected to the sealant source, the sealant application nozzle comprising a incurvate face with outlets configured to dispense sealant and bristles extending outward from the incurvate face.

Yet another embodiment of the present disclosure provides a method of applying sealant to a fastener. The fastener is positioned in contact with a number of bristles of a sealant application nozzle. The fastener is rotated while maintaining contact with the number of bristles to apply sealant to the fastener. The fastener is moved in a vertical direction while rotating the fastener and maintaining contact with the number of bristles.

A yet further embodiment of the present disclosure provides a method of applying sealant to a fastener. Pressure is applied to a sealant source to send sealant from the sealant source into a port of a sealant application nozzle, through channels of the sealant application nozzle, through outlets of the channels, and onto an incurvate face of the sealant application nozzle and base of bristles extending outward from the incurvate face. The fastener is positioned in contact with a number of bristles of a sealant application nozzle. The fastener is rotated while maintaining contact with the number of bristles to apply sealant to the fastener.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. For example, the illustrative examples recognize and take into account that in current assembly of aircraft structures using robotics, the drilling and fastening is accomplished using dual sided clamp-up with robots. Clamp-up is maintained by the two robots during drilling and fastening processes. The illustrative examples recognize and take into account that in the current assembly of aircraft, a multi-function end effector on the outside robot performs drilling and fastener insertion functions. The illustrative examples recognize and take into account that currently a fastener is fed using tubes from the fastener storage mechanism, and sealant is applied to this fastener once it reaches the end effector. The illustrative examples recognize and take into account that the sealant application mechanism is usually internal to the end effector. The illustrative examples recognize and take into account that internal sealant application adds complexity to the end effector design and operations.

The illustrative examples recognize and take into account that the various movements for providing adequate sealant application to the fastener add to the complexity and weight of the end effector. The illustrative examples recognize and take into account that replenishment of sealant supply requires the end effector operations to be stopped. The illustrative examples recognize and take into account that the cleaning/replacement of sealant applicator tips/brushes also requires the end effector operations be stopped. The illustrative examples recognize and take into account that inspection of the quality of the sealant application to the fastener is also difficult as it is not visible prior to the insertion into the drilled hole.

Current solutions of sealant application systems are internal to the end effector. These systems complicate the design of the end effector and do not provide visible inspection of the quality of applied sealant.

The illustrative examples provide a sealant application assembly that can apply sealant to fasteners outside of end effectors. The sealant application assembly is configured to apply sealant to fasteners having a plurality of different fastener diameters.

Figure 1:
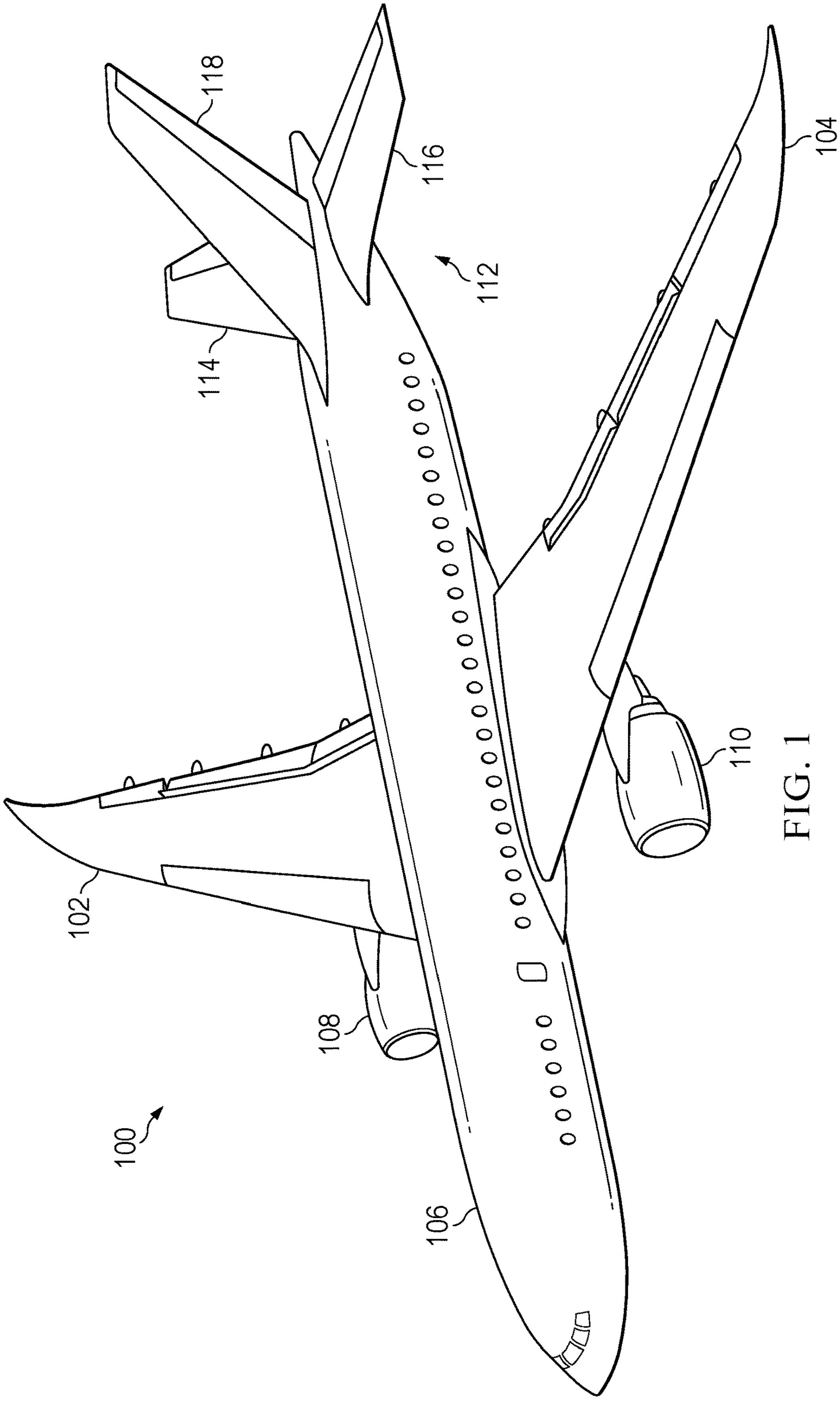
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft with fasteners joining components. The fasteners in aircraft 100 can have sealant applied by sealant application assembly 200 of FIG. 2 during manufacturing.

Figure 2:
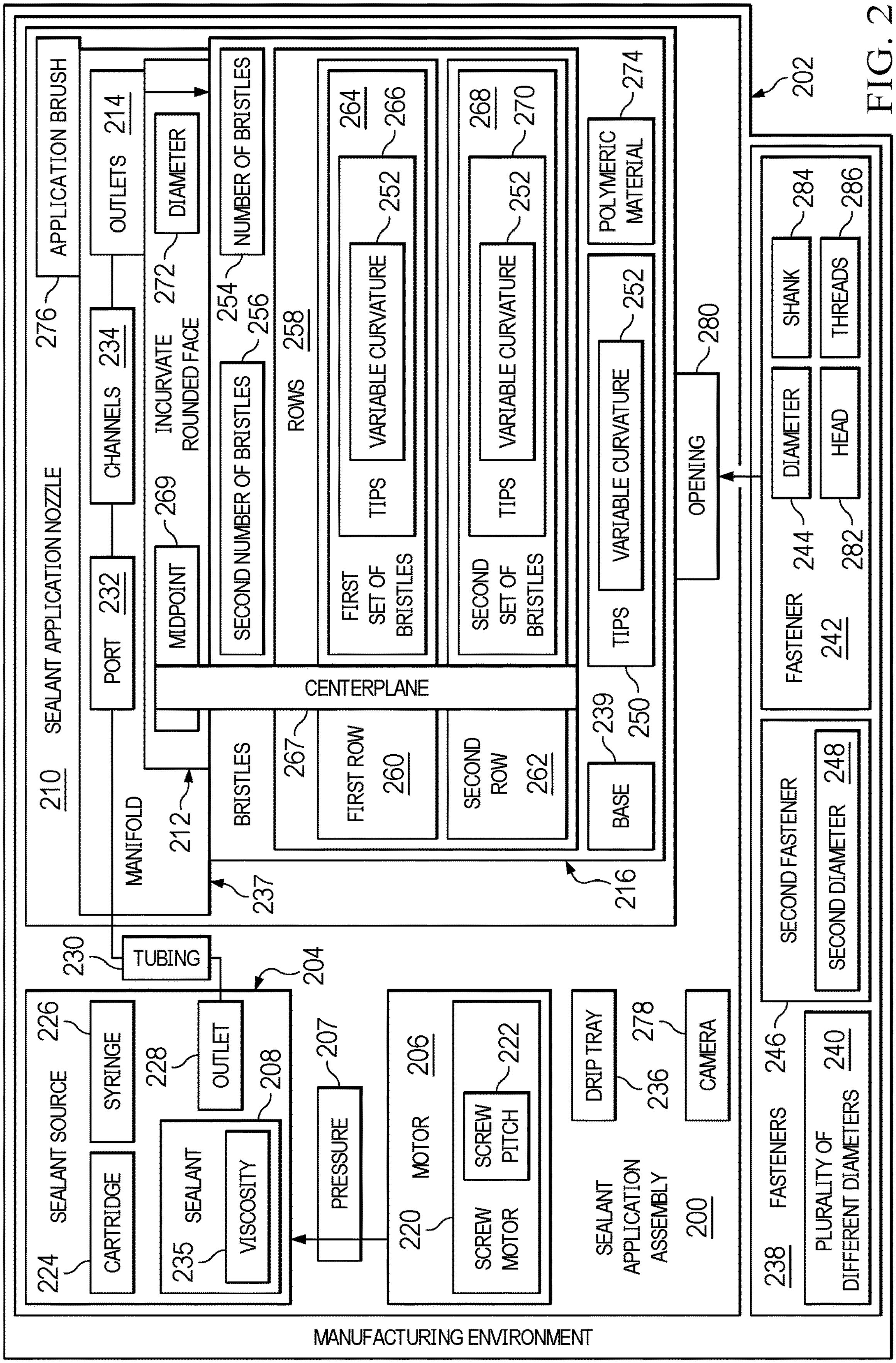
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Sealant application assembly 200 in manufacturing environment 202 can apply sealant to fasteners to be used in aircraft 100 of FIG. 1. Fasteners with sealant applied by sealant application assembly 200 can be present in at least one of body 106, wing 102, or wing 104 of FIG. 1.

Sealant application assembly 200 comprises sealant source 204, motor 206 configured to apply pressure 207 to sealant source 204 to extrude sealant 208 from sealant source 204, and sealant application nozzle 210 connected to sealant source 204. Sealant application nozzle 210 comprises incurvate face 212 with outlets 214 configured to dispense sealant 208 and bristles 216 extending outward from incurvate face 212.

Motor 206 can take any desirable form to apply pressure 207 to sealant source 204. In some illustrative examples, motor 206 is screw motor 220. Screw pitch 222 can be adjusted based on a desired amount of pressure 207 to be applied to sealant source 204. In some illustrative examples, a pneumatic valve is present to apply pressure to sealant source 204.

Sealant source 204 takes any desirable form. In some illustrative examples, sealant source 204 takes the form of cartridge 224. In some illustrative examples, sealant source 204 takes the form of syringe 226.

Outlet 228 of sealant source 204 is connected to sealant application nozzle 210 by tubing 230. In this illustrative example, sealant 208 from sealant source 204 enters sealant application nozzle 210 at port 232. From port 232, sealant 208 travels through channels 234 within sealant application nozzle 210. Channels 234 have any desirable shape, position, and quantity based on viscosity 235 of sealant 208 and locations of outlets 214. Channels 234 deliver sealant 208 to outlets 214.

Sealant application nozzle 210 comprises manifold 237 with incurvate face 212, channels 234 extending through manifold 237 and culminating in outlets 214 exiting through incurvate face 212, bristles 216 extending outward from incurvate face 212, and channels 234 within manifold 237 culminating in outlets 214 exiting through incurvate face 212 to dispose sealant 208 onto the incurvate face 212 and base 239 of bristles 216. Base 239 of bristles 216 connect bristles 216 to incurvate face 212.

In some illustrative examples, sealant application nozzle 210 is referred to as application brush 276. In some illustrative examples, manifold 237 and bristles 216 are formed of polymeric material 274.

Outlets 214 dispense sealant 208 to within incurvate face 212. Sealant 208 is dispersed within and onto incurvate face 212. Sealant 208 travels between bristles 216 of sealant application nozzle 210. As sealant 208 is supplied to incurvate face 212, some excess can fall from sealant application nozzle 210.

In some illustrative examples, sealant application assembly 200 further comprises drip tray 236 positioned below sealant application nozzle 210 and configured to collect excess sealant falling from sealant application nozzle 210. Drip tray 236 can prevent excess sealant from falling onto a manufacturing floor.

Sealant application assembly 200 is configured to apply sealant 208 to fasteners 238 of plurality of different diameters 240. More specifically, bristles 216 are configured to apply sealant 208 to fasteners 238 of plurality of different diameters 240.

For example, sealant application assembly 200 can apply sealant 208 to fastener 242 with diameter 244 and second fastener 246 with second diameter 248 different from diameter 244. Sealant application nozzle 210 can apply sealant 208 to fastener 242 with diameter 244 and second fastener 246 with second diameter 248.

To apply sealant 208 to fasteners 238 of plurality of different diameters 240, tips 250 of bristles 216 form variable curvature 252 configured to contact a fastener, such as fastener 242 or second fastener 246. Variable curvature 252 accommodates fasteners 238 of plurality of different diameters 240.

Tips 250 of bristles 216 form opening 280 for accepting fasteners 238. Opening 280 has variable curvature 252 and is configured to apply sealant to fasteners 238 having plurality of different diameters 240.

Fasteners 238 having greater diameters will contact a larger quantity of bristles 216 than fasteners 238 having smaller diameters. For example, fastener 242 having diameter 244 contacts number of bristles 254 of sealant application nozzle 210 during application of sealant 208 to fastener 242. Second fastener 246 having second diameter 248 contacts second number of bristles 256 of sealant application nozzle 210 during application of sealant 208 to second fastener 246. When second diameter 248 is greater than diameter 244, second number of bristles 256 has a greater quantity of bristles. In some illustrative examples, second number of bristles 256 includes number of bristles 254.

Bristles 216 are positioned in any desirable arrangement. In some illustrative examples, bristles 216 are randomly arranged. In some illustrative examples, bristles 216 are equally spaced. In some illustrative examples, bristles 216 have more than one arrangement. In some illustrative examples, bristles 216 are arranged in columns.

In some illustrative examples, bristles 216 are arranged in rows 258, and each row comprises a variable curvature formed by tips of bristles in the row. For example, rows 258 includes first row 260 and second row 262. First row 260 comprises first set of bristles 264 of bristles 216. First set of bristles 264 has tips 266 of tips 250. Tips 266 form variable curvature 252 in first row 260.

Second row 262 comprises second set of bristles 268 of bristles 216. Second set of bristles 268 has tips 270 of tips 250. Tips 270 form variable curvature 252 in second row 262.

Outlets 214 are configured to distribute sealant 208 to bristles 216. Outlets 214 have any desirable quantity, spacing, and layout. In some illustrative examples, outlets 214 are symmetrical along a centerplane 267 extending through rows 258. In other illustrative examples, outlets 214 are not symmetrical. In some illustrative examples, outlets 214 are positioned where bristles would otherwise be positioned. In some illustrative examples, outlets 214 are positioned in a top half of manifold 237. In other illustrative examples, outlets 214 are positioned evenly across manifold 237. In some illustrative examples, outlets 214 are positioned in a bottom half of manifold 237.

In some illustrative examples, each bristle of a respective row comprises a tip with a different angle than every other bristle of the respective row. For example, each bristle of first set of bristles 264 in first row 260 has a tip with a different angle than every other bristle of first set of bristles 264. As another example, each bristle of second set of bristles 268 in second row 262 has a tip with a different angle than every other bristle of second set of bristles 268.

Although tips 250 form variable curvature 252 to accommodate plurality of different diameters 240, in some illustrative examples, diameter 272 of incurvate face 212 is constant.

In some illustrative examples, camera 278 is positioned to image a fastener within incurvate face 212 as the fastener moves relative to sealant application nozzle 210. In some illustrative examples, camera 278 is positioned to image a fastener, such as fastener 242, as sealant 208 is applied to fastener 242. In some illustrative examples, camera 278 is positioned to image a fastener, such as fastener 242, after sealant 208 is applied to fastener 242.

Imaging from camera 278 is used to determine if a desired surface is covered in sealant 208. In some illustrative examples, sealant 208 is applied to shank 284 of fastener 242. In some illustrative examples, sealant 208 is applied to bottom of head 282 of fastener 242. In some illustrative examples, sealant 208 is applied to threads 286 of fastener 242. The portion of fastener 242 can be referred to as a desired surface.

In some illustrative examples, channels 234 are symmetrical along a centerplane 267 extending through midpoint 269 of the incurvate face 212. In some illustrative examples, channels 234 are positioned in a top half of manifold 237.

In some illustrative examples, sealant application nozzle 210 is disposable. When sealant application nozzle 210 is disposable, maintenance and cleaning efforts can be reduced. In some illustrative examples, sealant application nozzle 210 can be attached to the remainder of sealant application assembly 200 using a quick-release approach. When a quick release connector is utilized, sealant application nozzle 210 can be quickly and easily replaced during production. Sealant application nozzle 210 can be removed and replaced either for cleaning or for disposal. In some illustrative examples, sealant application nozzle 210 is removed and replaced with a nozzle configured to apply sealant to fasteners having different diameters.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, sealant source 204 is connected to tubing 230 by a luer connector. In some illustrative examples, tubing 230 may also be referred to as a needle.

Although not depicted, a heater can be associated with sealant source. In some illustrative examples, sealant source 204 can be maintained at a desired temperature to control viscosity 235 and flow of sealant 208.

Figure 3:
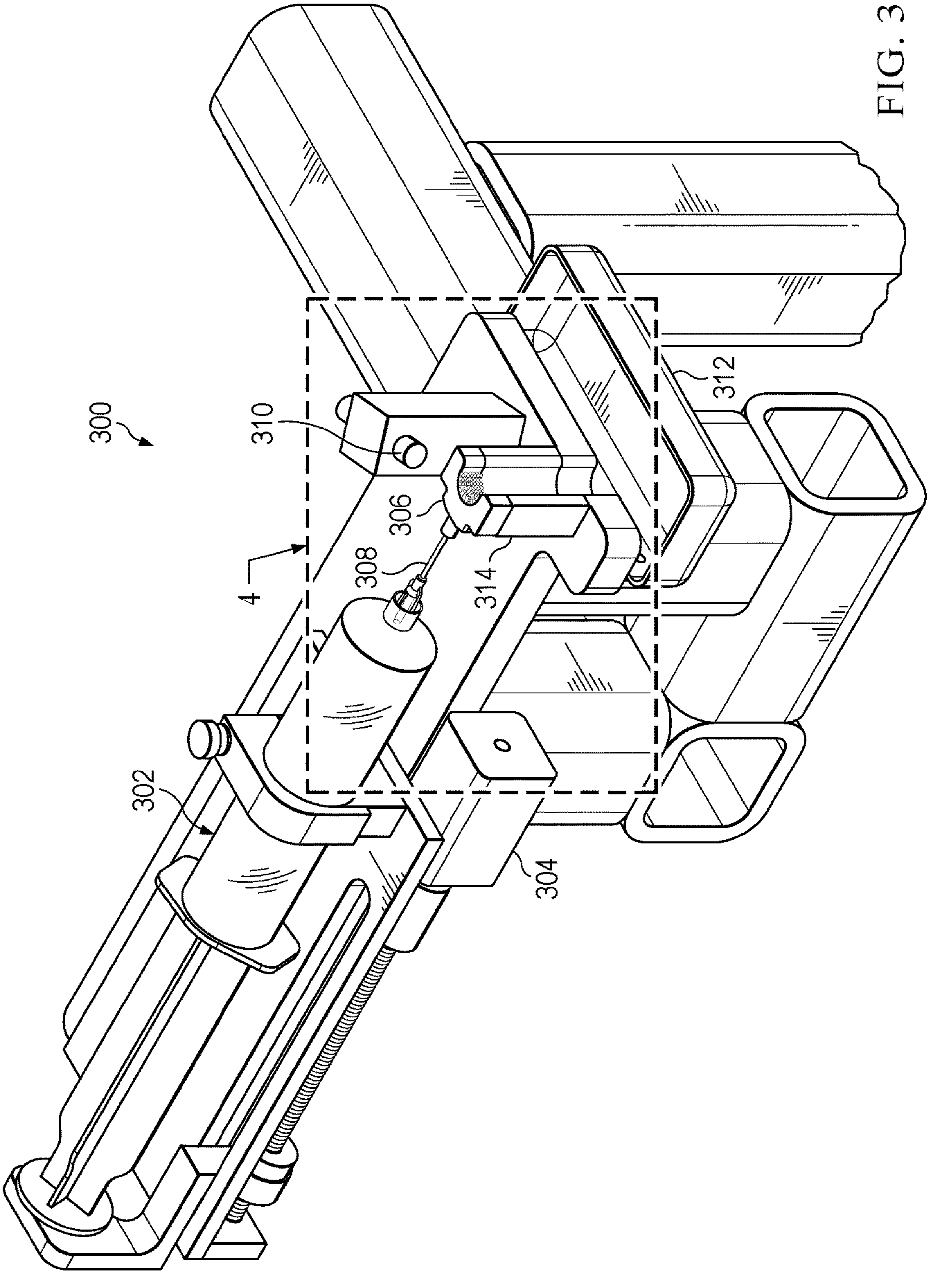
FIG. 3 is an illustration of a perspective view of a sealant application assembly in accordance with an illustrative embodiment.

Turning now to FIG. 3, an illustration of a perspective view of a sealant application assembly is depicted in accordance with an illustrative embodiment. Sealant application assembly 300 is a physical implementation of sealant application assembly 200 of FIG. 2.

Sealant application assembly 300 comprises sealant source 302, motor 304 configured to apply pressure to sealant source 302 to extrude sealant from sealant source 302, and sealant application nozzle 306 connected to sealant source 302. In this illustrative example, tubing 308 connects sealant source 302 to sealant application nozzle 306.

In this illustrative example, camera 310 is present in sealant application assembly 300 to inspect a fastener. Camera 310 is positioned to image a fastener after application of a sealant by sealant application nozzle 306. Camera 310 is positioned such that the fastener can be inspected at least one of during or just after application of the sealant. If there is an insufficient amount of sealant on the fastener, the fastener can be placed back in contact with sealant application nozzle to apply additional sealant to the fastener. In this illustrative example, the camera is positioned such that a fastener can be inspected as it moves relative to sealant application nozzle 306.

Sealant application nozzle 306 is positioned above collection tray 312. Collection tray 312 catches sealant that falls from sealant application nozzle 306. Sealant application nozzle 306 is connected to mount 314 to elevate sealant application nozzle 306 to sealant source 302. Mount 314 is configured to allow for a fastener to contact sealant application nozzle 306 without impacting mount 314.

Figure 4:
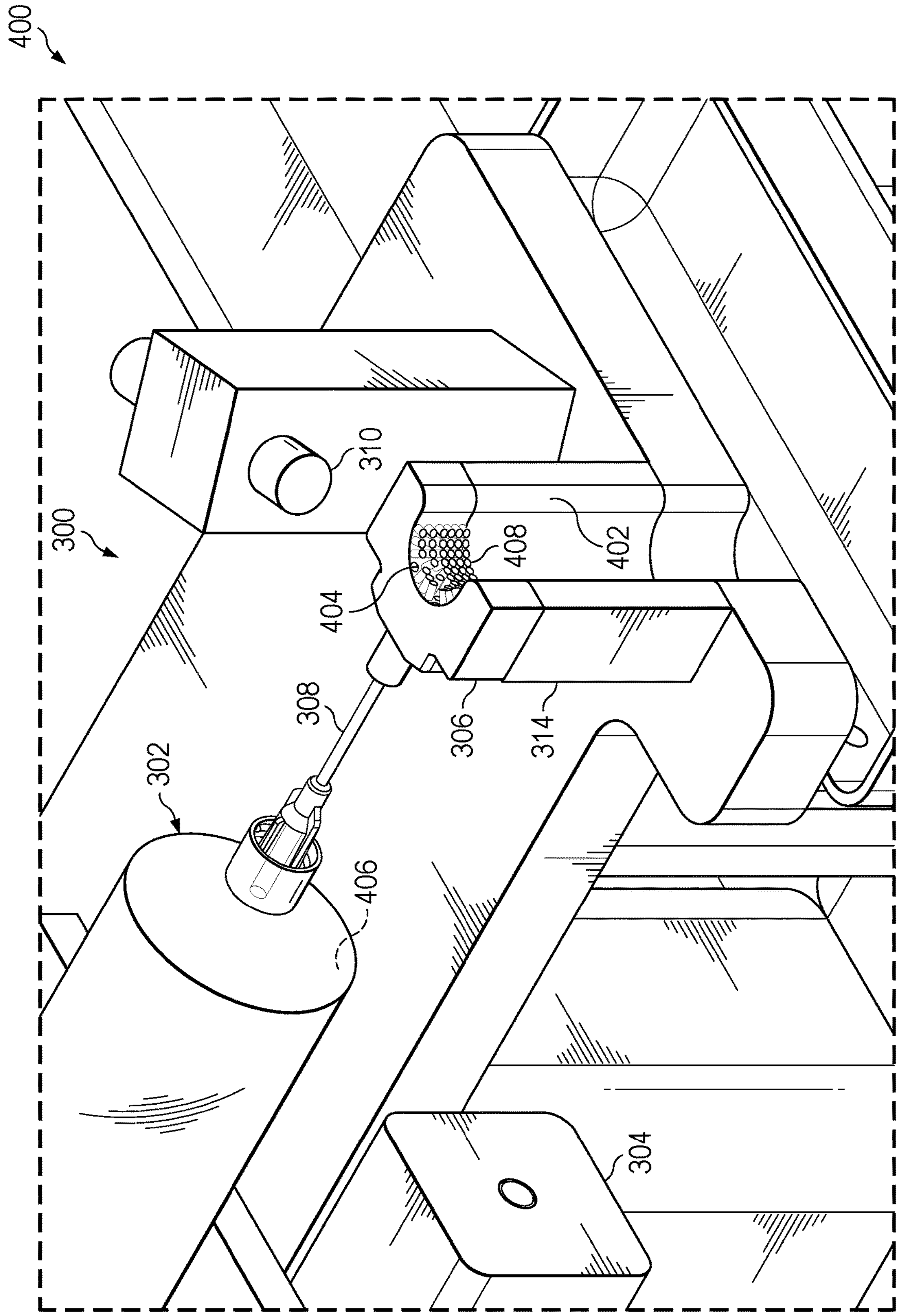
FIG. 4 is an illustration of a perspective view of a sealant application assembly in accordance with an illustrative embodiment.

Turning now to FIG. 4, an illustration of a perspective view of a sealant application assembly is depicted in accordance with an illustrative embodiment. View 400 is a view within the box labeled as FIG. 4 in FIG. 3.

Sealant application nozzle 306 comprises incurvate face 402 with outlets 404 configured to dispense sealant 406 and bristles 408 extending outward from incurvate face 402. To apply sealant to a fastener, the fastener is placed within incurvate face 402 and in contact with bristles 408.

Figure 5:
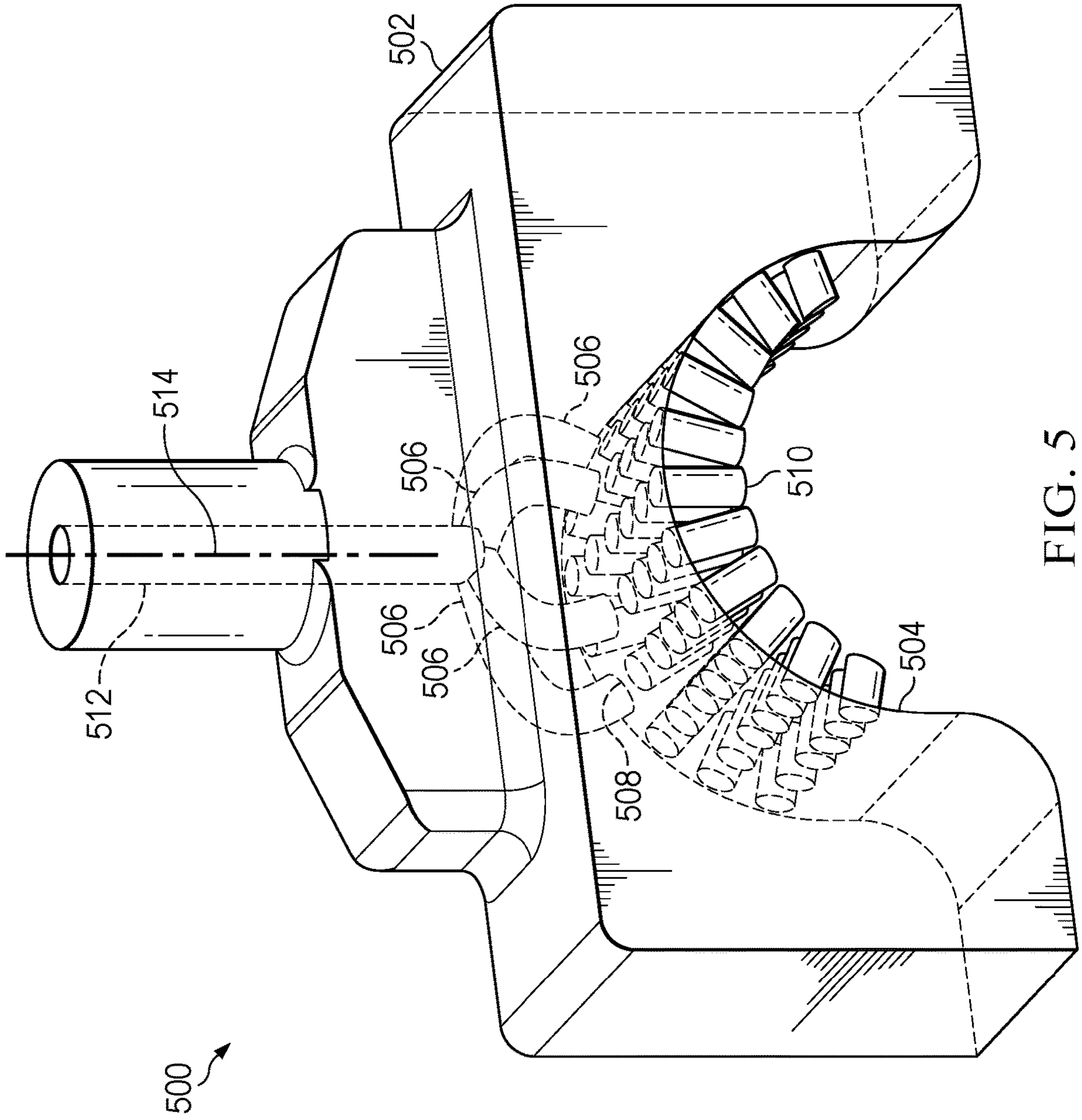
FIG. 5 is an illustration of a phantom perspective view of a sealant application nozzle in accordance with an illustrative embodiment.

Turning now to FIG. 5, an illustration of a phantom perspective view of a sealant application nozzle is depicted in accordance with an illustrative embodiment. Sealant application nozzle 500 is a physical implementation of sealant application nozzle 210 of FIG. 2. Sealant application nozzle 500 can be the same as sealant application nozzle 306 of FIGS. 3 and 4.

Sealant application nozzle 500 comprises manifold 502 with incurvate face 504, channels 506 extending through manifold 502 and culminating in outlets 508 exiting through incurvate face 504, and bristles 510 extending outward from incurvate face 504. To apply sealant to a fastener, sealant is supplied to sealant application nozzle 500 through port 512. Sealant enters through port 512 and is distributed to channels 506. Sealant exits channels 506 at outlets 508 in incurvate face 504. The sealant spreads across incurvate face 504 and between bristles 510. By placing a fastener in contact with a number of bristles of bristles 510 and rotating the fastener, sealant is applied to the fastener.

Sealant application nozzle 500 is formed of a material configured to contact a fastener without undesirably affecting the fastener. In some illustrative examples, manifold 502 and bristles 510 are formed of a polymeric material. Manifold 502 has centerplane 514. In some illustrative examples, at least one of bristles 510 or outlets 508 are symmetrical about centerplane 514.

Figure 6:
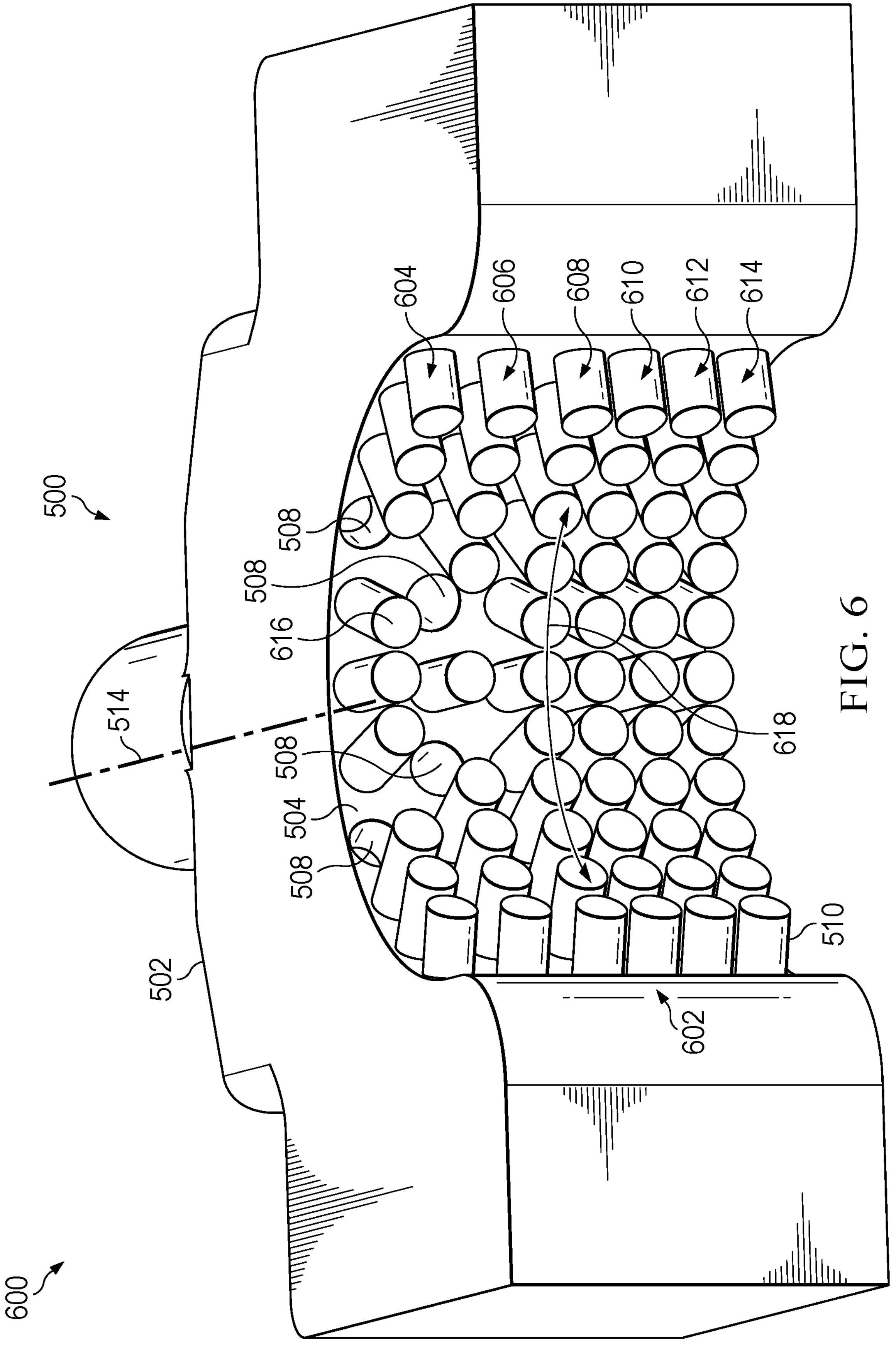
FIG. 6 is an illustration of a front perspective view of a sealant application nozzle in accordance with an illustrative embodiment.

Turning now to FIG. 6, an illustration of a front perspective view of a sealant application nozzle is depicted in accordance with an illustrative embodiment. View 600 is a front perspective view of sealant application nozzle 500 of FIG. 5.

As can be seen in view 600, bristles 510 are arranged in rows 602. Rows 602 include row 604, row 606, row 608, row 610, row 612, and row 614. As depicted, row 608, row 610, row 612, and row 614 each have the same quantity of bristles. In this illustrative example, row 604 and row 606 have fewer bristles than the remaining rows.

Outlets 508 extend through incurvate face 504 in row 604 and row 606. In this illustrative example, row 604 and row 606 have fewer bristles than row 608 due to outlets 508. In this illustrative example, outlets 508 are symmetrical along centerplane 514 extending through rows 602. In this illustrative example, outlets 508 are positioned in a top half of manifold 502.

In this illustrative example, each bristle of a respective row comprises a tip with a different angle than every other bristle of the respective row. For example, each bristle of row 604 comprises a tip with a different angle than every other bristle of row 604. Likewise, each bristle of row 608 comprises a tip with different angle than every other bristle of row 608.

Due to the concavity of incurvate face 504, bristles in a respective row can have different lengths. The length of each respective bristle in a row is configured to form variable curvature 618.

To apply sealant to fasteners of a plurality of different diameters, tips 616 of bristles 510 form variable curvature 618 configured to contact a fastener. Variable curvature 618 accommodates fasteners of a plurality of different diameters. Each row of rows 602 forms variable curvature 618.

Figure 7:
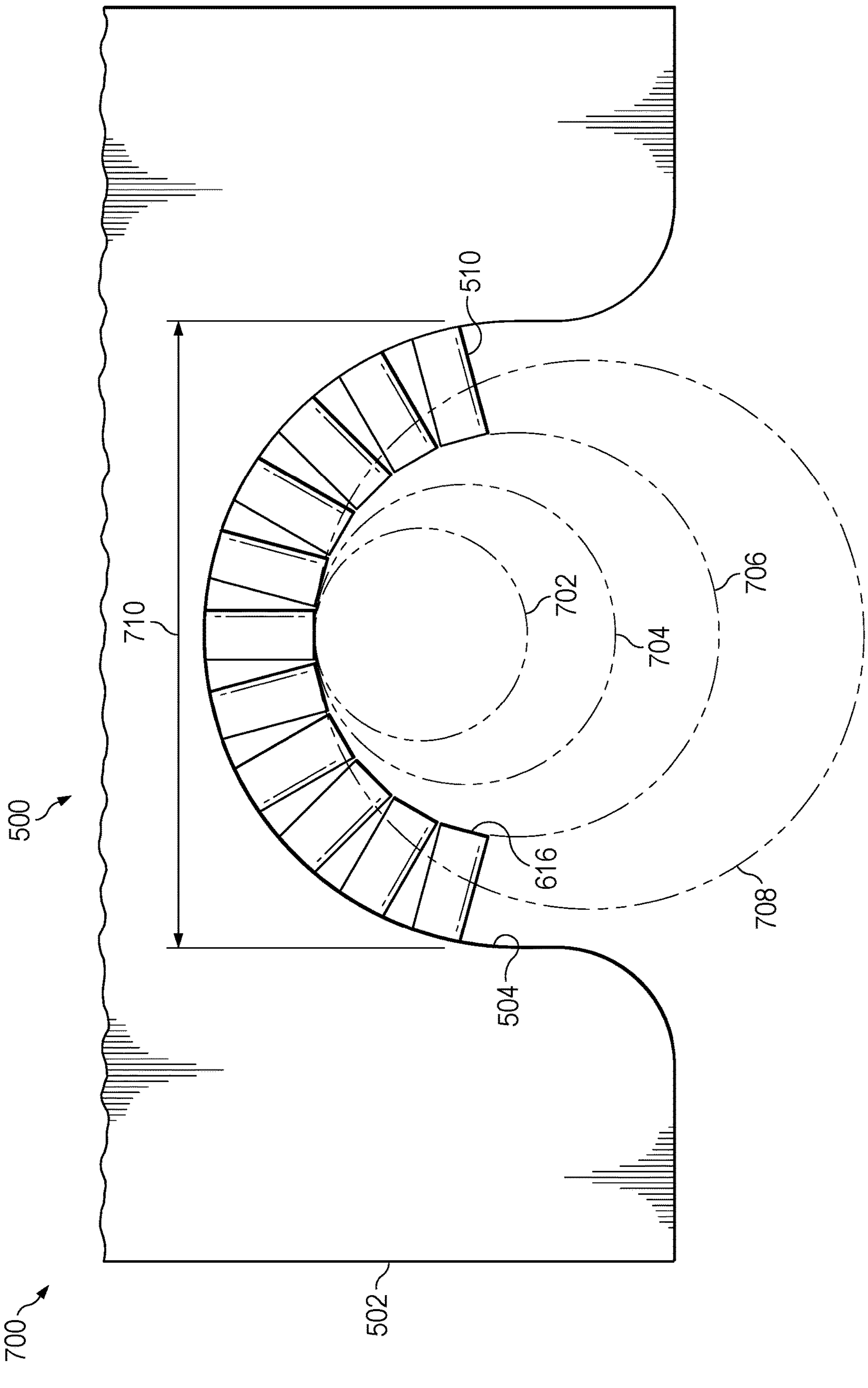
FIG. 7 is an illustration of a top view of a sealant application nozzle in accordance with an illustrative embodiment.

Turning now to FIG. 7, an illustration of a top view of a sealant application nozzle is depicted in accordance with an illustrative embodiment. View 700 is a top-down view of sealant application nozzle 500 of FIGS. 5-6. View 700 is a view of sealant application nozzle 500 with a series of circles representing various diameters of fasteners.

Bristles 510 are configured to apply sealant to fasteners of a plurality of different diameters. To apply sealant to fasteners of a plurality of different diameters, tips 616 of bristles 510 form variable curvature 618 are configured to contact a fastener. Variable curvature 618 accommodates fasteners of a plurality of different diameters.

Fasteners having greater diameters will contact a larger quantity of bristles than fasteners having smaller diameters. Circle 702, circle 704, and circle 706 depict diameters of fasteners that would desirably have sealant applied by sealant application nozzle 500. Sealant application nozzle 500 is designed to apply sealant to fasteners that have diameters between the diameter of circle 706 and circle 702. Variable curvature 618 has been designed to apply sealant to each of circle 702, circle 704, and circle 706.

Circle 702 represents the diameter of a small fastener that contacts three bristles of bristles 510 during application of sealant to the fastener. Circle 704 represents the diameter of a fastener that contacts between three and five bristles of bristles 510 during application of sealant to the fastener. Circle 704 is larger than circle 702, thus circle 704 contacts more bristles of bristles 510. Circle 706 is larger than circle 704 and contacts more bristles of bristles 510.

Circle 708 represents a diameter of a fastener that will not have sealant applied by sealant application nozzle 500. Circle 708 is too large to contact variable curvature 618.

As can be seen in view 700, diameter 710 of incurvate face 504 is constant. As can be seen in view 700, tips 616 of bristles 510 form variable curvature 618. As can be seen in view 700, each row comprises variable curvature 618 formed by tips of bristles in the row.

Figure 8:
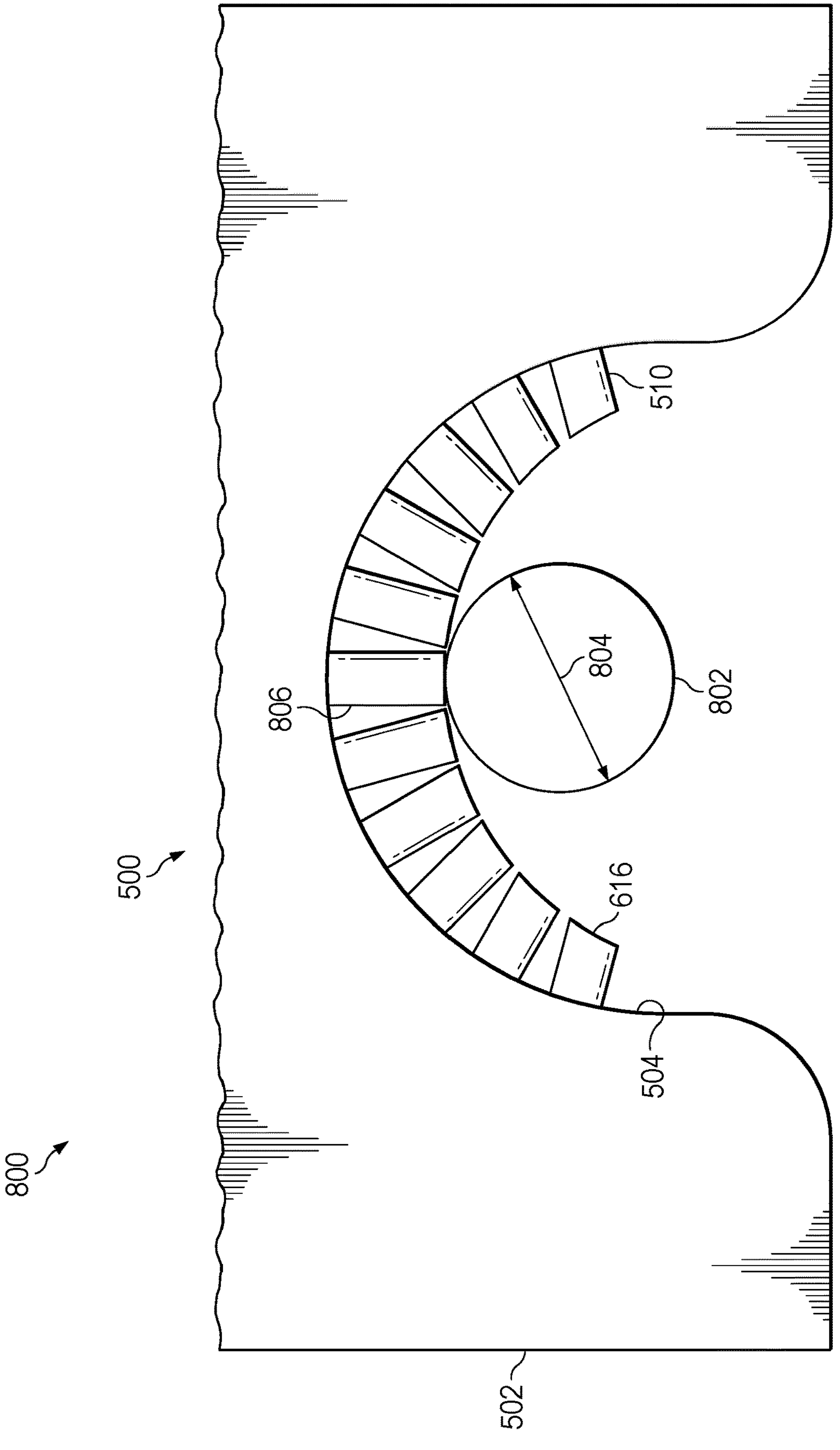
FIG. 8 is an illustration of a top view of a sealant application nozzle with a fastener in accordance with an illustrative embodiment.

Turning now to FIG. 8, an illustration of a top view of a sealant application nozzle with a fastener is depicted in accordance with an illustrative embodiment. View 800 is a top view of sealant application nozzle 500 of FIGS. 5-7 with a small fastener.

In view 800, fastener 802 is in contact with some of bristles 510. Fastener 802 has diameter 804. Fastener 802 with diameter 804 contacts number of bristles 806 of sealant application nozzle 500 during application of sealant to fastener 802.

Figure 9:
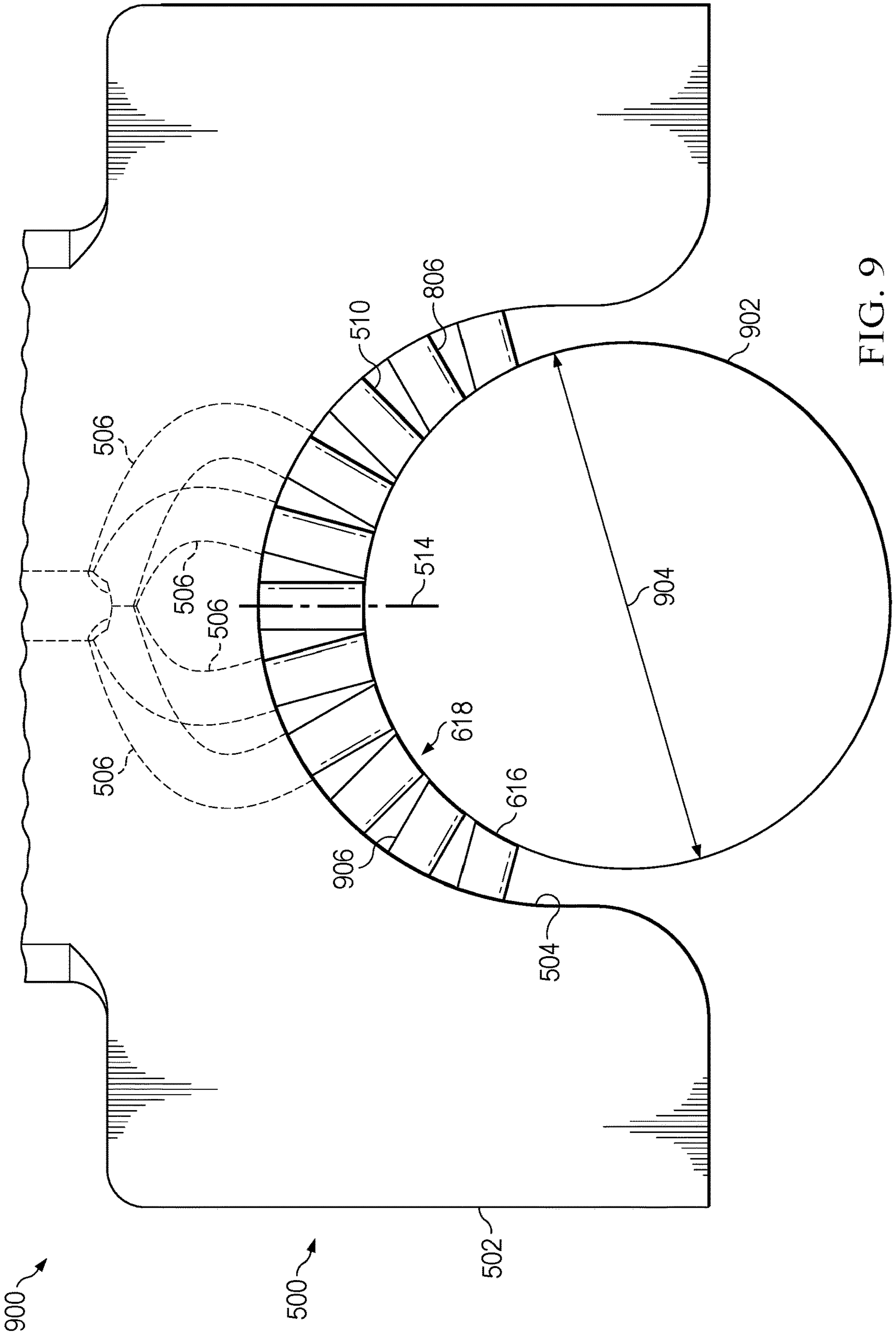
FIG. 9 is an illustration of a top view of a sealant application nozzle with a fastener in accordance with an illustrative embodiment.

Turning now to FIG. 9, an illustration of a top view of a sealant application nozzle with a fastener is depicted in accordance with an illustrative embodiment. View 900 is a top view of sealant application nozzle 500 of FIGS. 5-8 with a large fastener.

In view 900, second fastener 902 having second diameter 904 contacts second number of bristles 906 of sealant application nozzle 500 during application of sealant to second fastener 902. When second diameter 904 is greater than diameter 804, second number of bristles 906 has a greater quantity of bristles. As depicted, second number of bristles 906 includes number of bristles 806. In view 900, second fastener 902 contacts all of bristles 510.

As depicted in view 900, channels 506 are symmetrical along centerplane 514 extending through a midpoint of incurvate face 504. Channels 506 distribute sealant to bristles 510 to apply sealant to second fastener 902.

The illustration of sealant application nozzle 500 in FIGS. 5-9 is not meant to imply physical or architectural limitations to the manner in which an illustrative embodiment may be implemented. Other components in addition to or in place of the ones illustrated may be used. Some components may be unnecessary.

For example, the size, shape, position, and quantity of outlets 508 is set based on a type and viscosity of sealant to be applied. As another example, the size, shape, position, and quantity of channels 506 is set based on a type and viscosity of sealant to be applied. As yet another example, variable curvature 618 and angles of tips 616 of bristles 510 are set based on diameters of fasteners to have sealant applied. As yet a further example, the size, shape, position, and quantity of bristles 510 is set based on a size of fasteners to be sealed and the sealant to be used.

Figure 10:
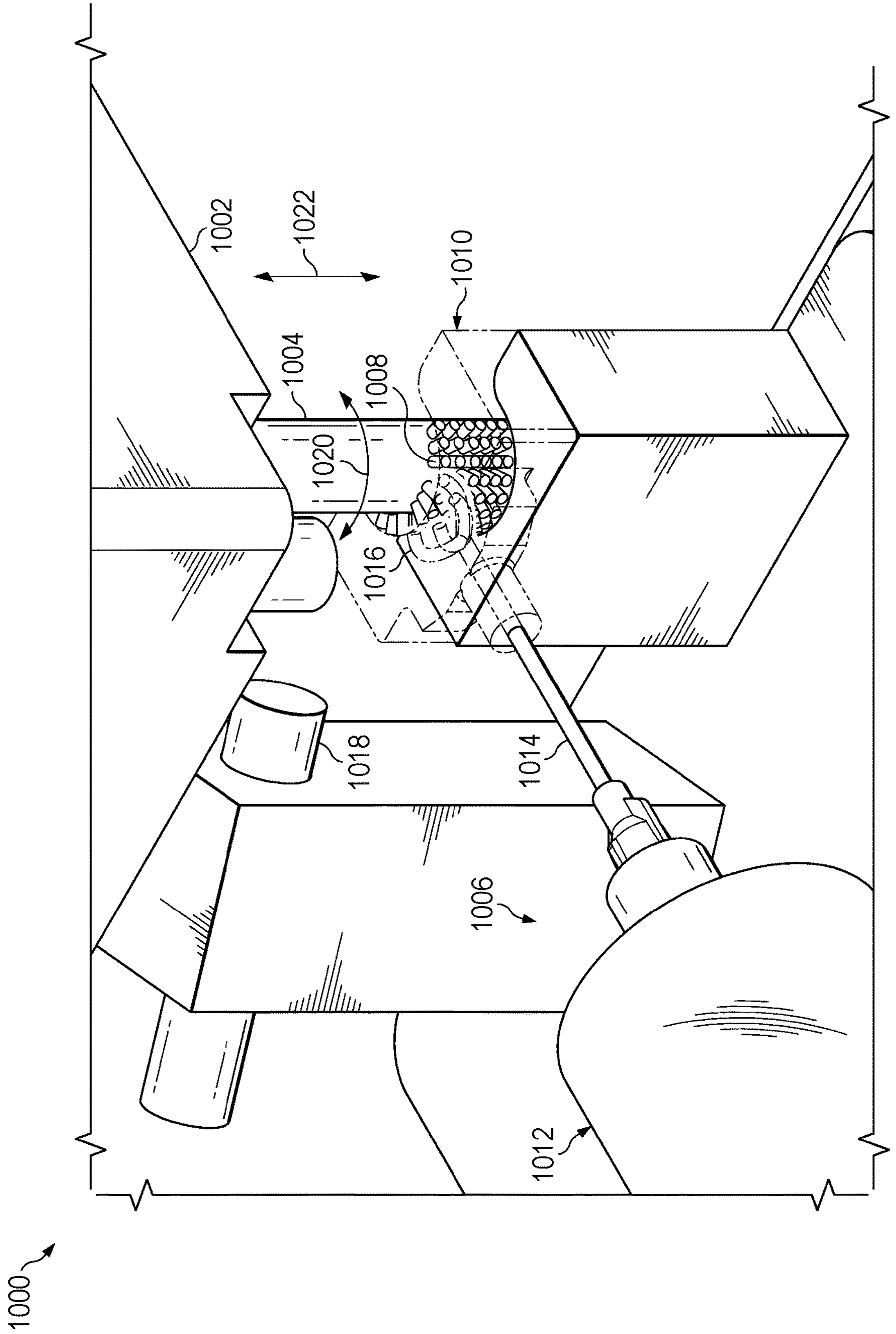
FIG. 10 is an illustration of a back perspective view of a sealant application assembly with portions in phantom in accordance with an illustrative embodiment.

Turning now to FIG. 10, an illustration of a back perspective view of a sealant application assembly with portions in phantom is depicted in accordance with an illustrative embodiment. View 1000 is a view of a back perspective view of sealant application assembly 1006. In view 1000, fastening end effector 1002 holds fastener 1004 to apply sealant to fastener 1004 using sealant application assembly 1006. In view 1000, fastener 1004 is placed into contact with bristles 1008 of sealant application nozzle 1010. Sealant source 1012 provides sealant to tubing 1014 that connects sealant source 1012 to channels 1016 in sealant application nozzle 1010.

Camera 1018 is positioned to image fastener 1004. In some illustrative examples, camera 1018 is positioned to image fastener 1004 during application of sealant to fastener 1004 by sealant application nozzle 1010. In some illustrative examples, camera 1018 is positioned to image fastener 1004 following application of sealant to fastener 1004 by sealant application nozzle 1010.

A desired application is 100% coverage of a designated surface of fastener 1004. In some illustrative examples, the designated surface of fastener 1004 is the shank of fastener 1004. In some illustrative examples, the designated surface of fastener 1004 is a bottom of the head of fastener 1004. If a portion of the designated surface of fastener 1004 is not covered by sealant, additional sealant will be applied to fastener 1004.

Sealant is applied to fastener 1004 as fastening end effector 1002 moves fastener 1004 in at least one of direction 1020 or direction 1022. By moving fastener 1004 in direction 1022, the length of fastener 1004 is coated by the sealant. By moving fastener 1004 in direction 1020, the circumference of fastener 1004 is coated by the sealant.

Figure 11:
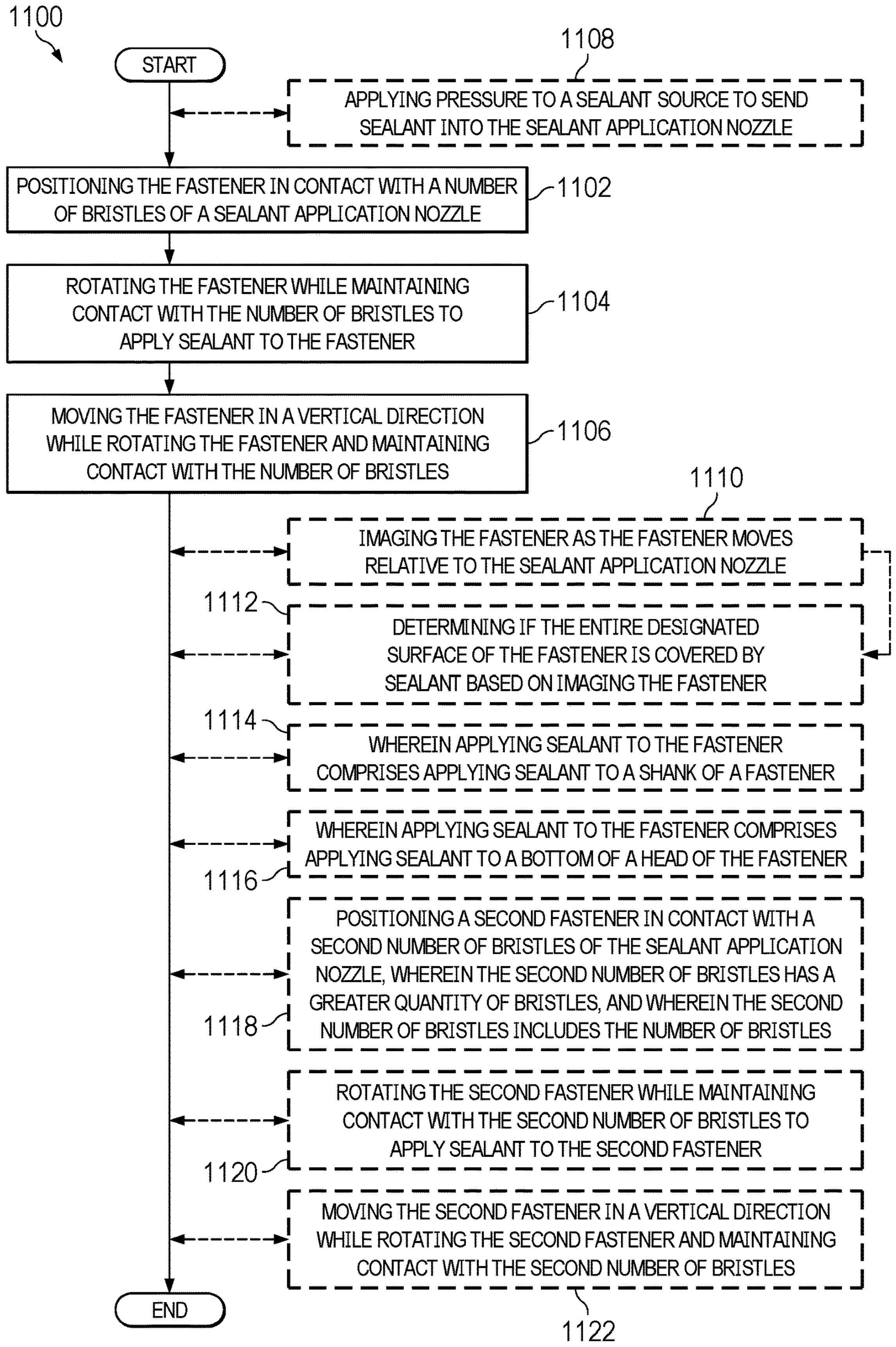
FIG. 11 is a flowchart of a method of applying sealant to a fastener in accordance with an illustrative embodiment.

Turning now to FIG. 11, a flowchart of a method of applying sealant to a fastener is depicted in accordance with an illustrative embodiment. Method 1100 can be performed in manufacturing aircraft 100 of FIG. 1. Method 1100 can be performed by sealant application assembly 200 of FIG. 2. Method 1100 can be performed by sealant application assembly 300 of FIGS. 3-4. Method 1100 can be performed using sealant application nozzle 500 of FIGS. 5-9. Method 1100 can be performed by sealant application assembly 1006 of FIG. 10.

Method 1100 positions the fastener in contact with a number of bristles of a sealant application nozzle (operation 1102). Method 1100 rotates the fastener while maintaining contact with the number of bristles to apply sealant to the fastener (operation 1104). Method 1100 moves the fastener in a vertical direction while rotating the fastener and maintaining contact with the number of bristles (operation 1106). Afterwards, method 1100 terminates.

In some illustrative examples, method 1100 applies pressure to a sealant source to send sealant into the sealant application nozzle (operation 1108). In some illustrative examples, the pressure is applied by a motor. In some illustrative examples, the pressure is applied by a plunger.

In some illustrative examples, method 1100 images the fastener as the fastener moves relative to the sealant application nozzle (operation 1110). In some illustrative examples, method 1100 images the fastener while the fastener is in contact with the sealant application nozzle. In some illustrative examples, method 1100 images the fastener while the fastener is held above the sealant application nozzle.

In some illustrative examples, method 1100 determines if an entire designated surface of the fastener is covered by sealant based on imaging the fastener (operation 1112). In some illustrative examples, applying sealant to the fastener comprises applying sealant to a shank of the fastener (operation 1114). In some illustrative examples, applying sealant to the fastener comprises applying sealant to a bottom of a head of the fastener (operation 1116).

In some illustrative examples, method 1100 positions a second fastener in contact with a second number of bristles of the sealant application nozzle, wherein the second number of bristles has a greater quantity of bristles, and wherein the second number of bristles includes the number of bristles (operation 1118). In some illustrative examples, method 1100 rotates the second fastener while maintaining contact with the second number of bristles to apply sealant to the second fastener (operation 1120). In some illustrative examples, method 1100 moves the second fastener in a vertical direction while rotating the second fastener and maintaining contact with the second number of bristles (operation 1122).

Figure 12:
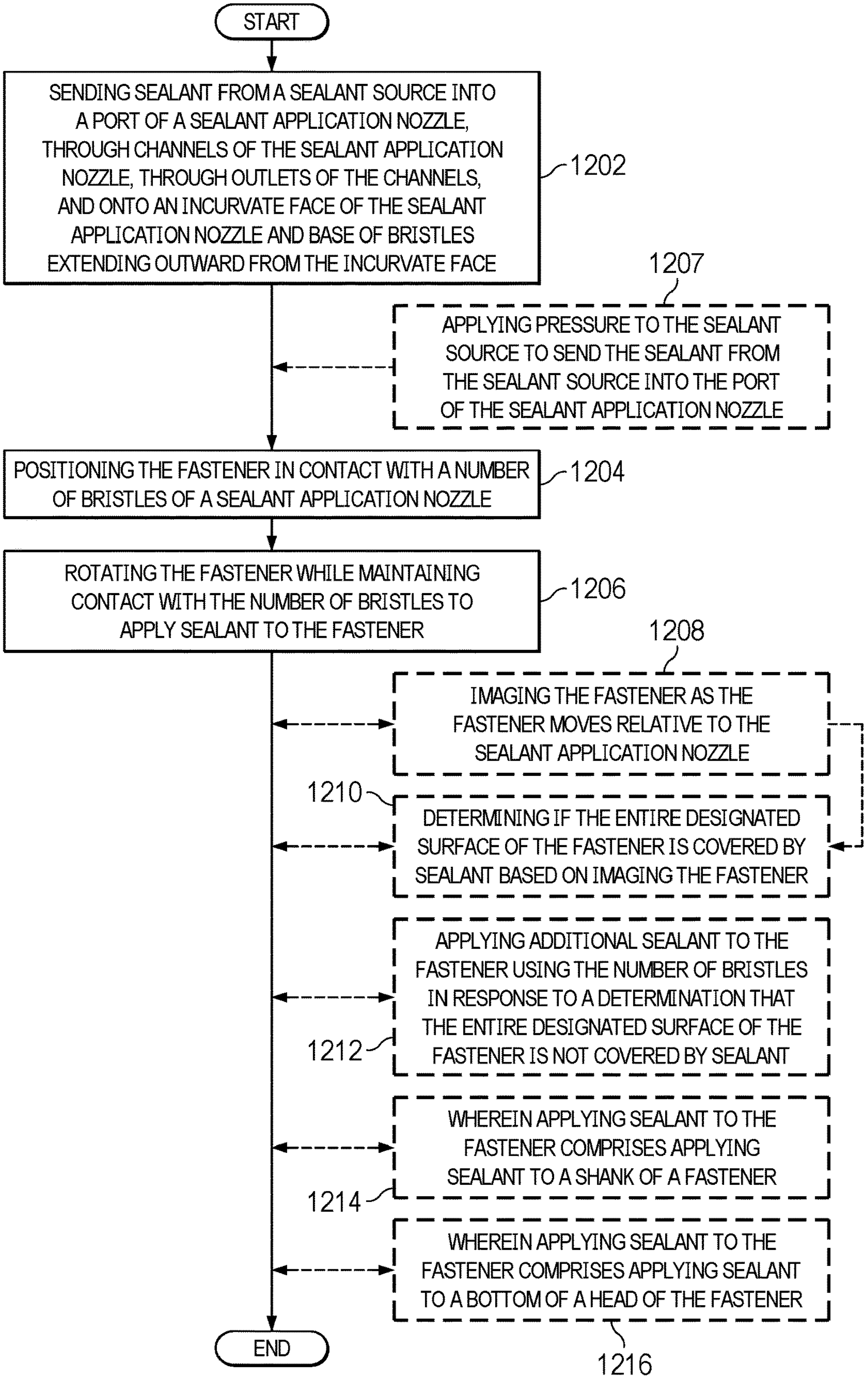
FIG. 12 is a flowchart of a method of applying sealant to a fastener in accordance with an illustrative embodiment.

Turning now to FIG. 12, a flowchart of a method of applying sealant to a fastener is depicted in accordance with an illustrative embodiment. Method 1200 can be performed in manufacturing aircraft 100 of FIG. 1. Method 1200 can be performed by sealant application assembly 200 of FIG. 2. Method 1200 can be performed by sealant application assembly 300 of FIGS. 3-4. Method 1200 can be performed using sealant application nozzle 500 of FIGS. 5-9. Method 1200 can be performed by sealant application assembly 1006 of FIG. 10.

Method 1200 sends sealant from A sealant source into a port of a sealant application nozzle, through channels of the sealant application nozzle, through outlets of the channels, and onto an incurvate face of the sealant application nozzle and base of bristles extending outward from the incurvate face (operation 1202). Method 1200 positions the fastener in contact with a number of bristles of a sealant application nozzle (operation 1204). Method 1200 rotates the fastener while maintaining contact with the number of bristles to apply sealant to the fastener (operation 1206). Afterwards, method 1200 terminates.

In some illustrative examples, method 1200 applies pressure to the sealant source to send the sealant from the sealant source into the port of the sealant application nozzle (operation 1207). In some illustrative examples, method 1200 images the fastener as the fastener moves relative to the sealant application nozzle (operation 1208). In some illustrative examples, method 1200 determines if an entire designated surface of the fastener is covered by sealant based on imaging the fastener (operation 1210). In some illustrative examples, method 1200 applies additional sealant to the fastener using the number of bristles in response to a determination that the entire designated surface of the fastener is not covered by sealant (operation 1212).

In some illustrative examples, applying sealant to the fastener comprises applying sealant to a shank of the fastener (operation 1214). In some illustrative examples, applying sealant to the fastener comprises applying sealant to a bottom of a head of the fastener (operation 1216).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1108 through operation 1122 maybe optional. As another example, operation 1208 through operation 1216 maybe optional.

Figure 13:
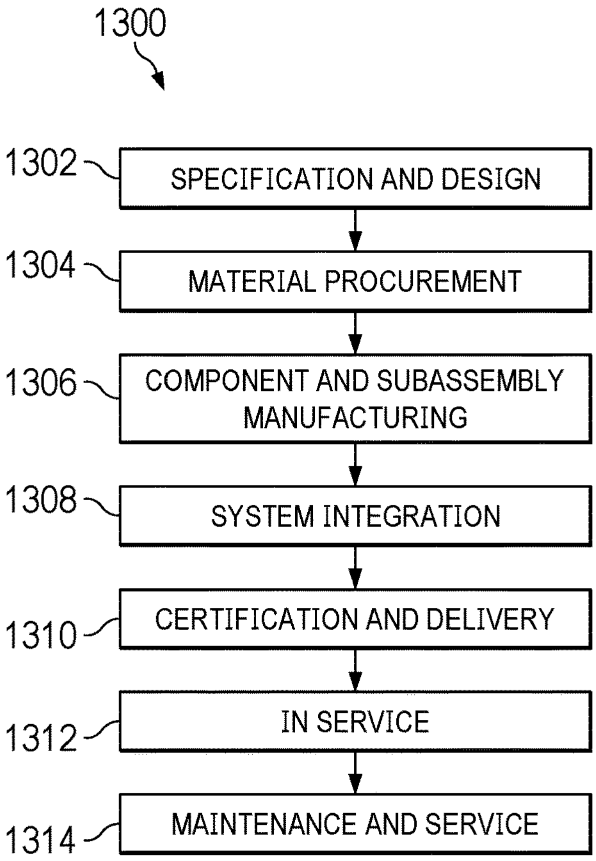
FIG. 13 is an illustration of an aircraft manufacturing and service method in a form of a block diagram in accordance with an illustrative embodiment.
Figure 14:
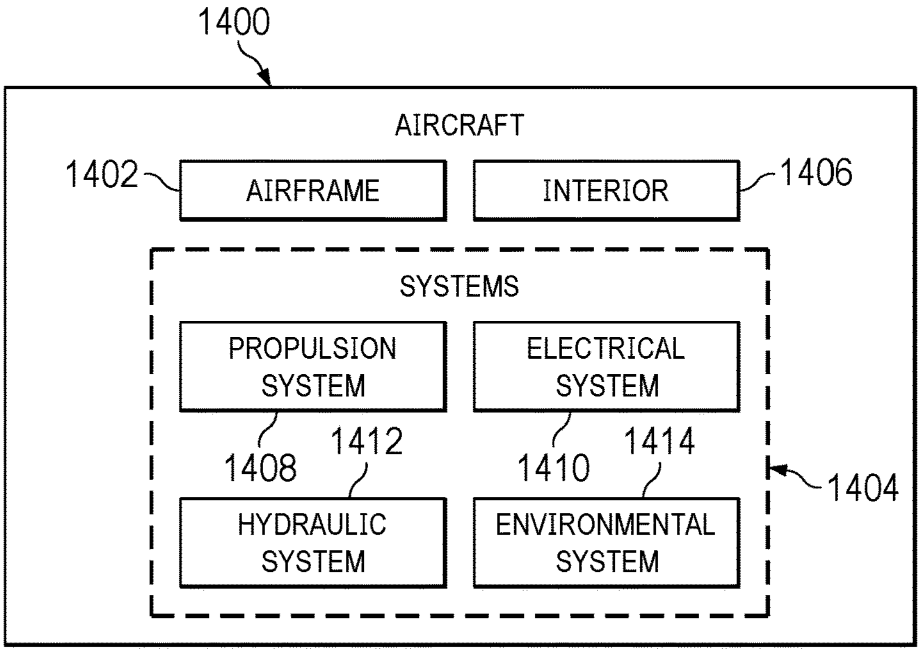
FIG. 14 is an illustration of an aircraft in a form of a block diagram in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method in a form of a block diagram is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may 1400 may go through certification and delivery 1310 in order to be placed in service 1312. While in service 1312 by a customer, aircraft 1400 is scheduled for routine maintenance and service 1314, which may include modification, reconfiguration, refurbishment, or other maintenance and service.

Each of the processes of aircraft manufacturing and service method 1300 maybe performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft in a form of a block diagram is depicted in which an illustrative embodiment may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included.

Apparatuses and methods embodied herein may be employed during at least one of the stages of aircraft manufacturing and service method 1300. One or more illustrative embodiments may be manufactured or used during at least one of component and subassembly manufacturing 1306, system integration 1308, in service 1312, or maintenance and service 1314 of FIG. 13.

The illustrative examples provide methods and a sealant application assembly. A fastener is moved to a home sealant applicator position. The fastener detail information is accessed. The fastener detail information can include at least one of type, diameter, and length.

The fastener is lowered into the incurvate face of a sealant brush via a path determined by the fastener diameter. A sealant source will begin to extrude sealant into the bristles of the brush assembly.

Custom sealant passages will promote even distribution throughout the application brush. The end effector will slowly retract and rotate the fastener to distribute sealant along the outer surface of the fastener.

In some illustrative examples, as the end effector clears the sealant brush applicator, a camera can be used to verify appropriate sealant application. If desired sealant coverage is achieved, sealant application is complete, and the fastener can then be used in further manufacturing. If desired sealant coverage is not achieved, the fastener is moved to a home position and proceeds through sealant application again so that sealant application can be repeated.

The illustrative examples present a sealant application module for applying sealant to fasteners for use in outside mould line (OML) fastening end effectors. A fastener is selected and picked up by the gripper of the end effector, then transferred to the sealant application module where sealant is applied. For sealant application, a brush with flexible applicator tips is used. This brush has multiple inlet ports which are fed a consistent flow of sealant through a sealant syringe. A fastener rotation and translation motion using the end effector is used to apply the sealant. The sealant application is verified with the help of a camera.

The use of the sealant application assembly with single function fastening end effectors reduces complexity of the fastening end effector. The fastener is picked by the fastening end effector and taken to the sealant applicator mechanism which is external to the end effector. Separating the sealant application assembly from the end effector simplifies the design and operations of the fastening end effector. The sealant applicator mechanism applies the sealant to the fastener and then the fastener is taken by the end effector to insert the fastener into a drilled hole.

The novel features of these illustrative examples include a syringe needle attached to a motor-driven sealant plunger which extrudes sealant onto the brush assembly. The syringe is connected with a luer to an application brush that will provide ample sealant within the flexible bristle to facilitate coverage on the fastener. In some illustrative examples, the OML end effector provides the rotation necessary to apply sealant to the full fastener diameter. In some illustrative examples, during retraction of the fastener from the brush assembly, a camera will verify appropriate and complete sealant application.

The sealant application nozzle of the illustrative examples includes multiple sealant passages leading to outlets strategically positioned within the bristles for optimal sealant distribution and minimum waste. The syringe comes with a luer lock to ensure a good connection, minimize leakage, and add inherent stiffness to the joint.

The illustrative examples use an external simplified sealant applicator system with the ability to check on the quality of applied sealant using an in-process camera.

In the illustrative examples, sealant application to the fastener is conducted external of a fastening end effector. Applying the sealant to the fastener outside of a fastening end effector provides visibility of the sealant application process. Visibility of the sealant application process allows for quality inspection of the applied sealant. Conducting sealant application to the fastener external of the fastening end effector simplifies the fastening end effector. By the fastening end effector not including internal sealant application, the end effector operations do not have to be stopped for sealant replenishment as well cleaning/replacement of brushes.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A sealant application nozzle that comprises:

a manifold that comprises an incurvate face;

bristles that comprise a base set within and that extend outward from the incurvate face, wherein the bristles are arranged in rows, and wherein each row comprises a variable curvature formed by tips of bristles in the row; and channels within the manifold that culminate in outlets that exit through the incurvate face configured to dispose sealant onto the incurvate face and the base of the bristles.

2. The sealant application nozzle of claim 1, wherein the manifold and the bristles are formed of a polymeric material.

3. The sealant application nozzle of claim 1, wherein the outlets are symmetrical along a centerplane extending through the rows.

4. The sealant application nozzle of claim 1, wherein the outlets are positioned in a top half of the manifold.

5. The sealant application nozzle of claim 1, wherein the channels are symmetrical along a centerplane extending through a midpoint of the incurvate face.

6. The sealant application nozzle of claim 1, wherein each bristle in a respective row comprises a tip with a different angle than every other bristle of the respective row.

7. The sealant application nozzle of claim 1, wherein the bristles are formed from a same material as the manifold.

8. A sealant application assembly that comprises:

a sealant source;

a motor configured to apply pressure to the sealant source and extrude sealant from the sealant source; and a sealant application nozzle connected to the sealant source, wherein the sealant application nozzle comprises an incurvate face that comprises:

outlets configured to dispense sealant; and bristles that extend outward from the incurvate face.

9. The sealant application assembly of claim 8 further comprising:

a camera positioned to image a fastener within the incurvate face as it moves relative to the sealant application nozzle.

10. The sealant application assembly of claim 8 further comprising:

a drip tray positioned below the sealant application nozzle and configured to collect excess sealant falling from the sealant application nozzle.

11. The sealant application assembly of claim 8, wherein the motor is a screw motor.

12. The sealant application assembly of claim 8, wherein the bristles are configured from a same material as the incurvate face.

13. The sealant application assembly of claim 8, wherein tips of the bristles form a variable curvature configured to contact a fastener.

14. The sealant application assembly of claim 8, wherein the bristles are formed of a polymeric material.

15. A method of applying a sealant to a fastener, the method comprising:

positioning the fastener in contact with bristles of a sealant application nozzle comprising:

a manifold comprising an incurvate face;

the bristles comprising a base set within and extending outward from the incurvate face, wherein the bristles are arranged in rows, and wherein each row comprises a variable curvature formed by tips of bristles in the row; and channels within the manifold culminating in outlets exiting through the incurvate face disposing sealant onto the incurvate face and the base of the bristles;

rotating the fastener while maintaining contact with the bristles to apply the sealant to the fastener; and moving the fastener in a vertical direction while rotating the fastener and maintaining contact with the bristles.

16. The method of claim 15 further comprising:

applying pressure to a sealant source to send sealant into the sealant application nozzle.

17. The method of claim 15 further comprising:

imaging the fastener as the fastener moves relative to the sealant application nozzle.

18. The method of claim 17 further comprising:

determining if an entire designated surface of the fastener is covered by sealant based on imaging the fastener.

19. The method of claim 15, wherein applying sealant to the fastener comprises applying sealant to a shank of the fastener.

20. The method of claim 15, wherein applying sealant to the fastener comprises applying sealant to a bottom of a head of the fastener.

21. The method of claim 15 further comprising:

positioning a second fastener in contact with second bristles extending outward from the incurvate face of the sealant application nozzle, wherein the second bristles are additional to the bristles;

rotating the second fastener while maintaining contact with the second bristles to apply sealant to the second fastener; and moving the second fastener in a vertical direction while rotating the second fastener and maintaining contact with the second bristles.

22. A method of applying sealant to a fastener, the method comprising:

sending sealant from a sealant source into a port of a sealant application nozzle, through channels of the sealant application nozzle, through outlets of the channels, and onto an incurvate face of the sealant application nozzle and base of bristles extending outward from the incurvate face;

positioning the fastener in contact with bristles of a sealant application nozzle comprising:

a manifold comprising the incurvate face;

the bristles comprising a base set within and extending outward from the incurvate face, wherein the bristles are arranged in rows, and wherein each row comprises a variable curvature formed by tips of bristles in the row; and channels within the manifold culminating in outlets exiting through the incurvate face disposing sealant onto the incurvate face and the base of the bristles; and rotating the fastener while maintaining contact with the bristles to apply sealant to the fastener.

23. The method of claim 22 further comprising:

applying pressure to the sealant source to send the sealant from the sealant source into the port of the sealant application nozzle.

24. The method of claim 22 further comprising:

imaging the fastener as the fastener moves relative to the sealant application nozzle.

25. The method of claim 24 further comprising:

determining if an entire designated surface of the fastener is covered by sealant based on imaging the fastener.

26. The method of claim 25 further comprising:

applying additional sealant to the fastener using the bristles in response to a determination that the entire designated surface of the fastener is not covered by sealant.

27. The method of claim 22, wherein applying sealant to the fastener comprises applying sealant to a shank of the fastener.

28. The method of claim 22, wherein applying sealant to the fastener comprises applying sealant to a bottom of a head of the fastener.

* * * * *